(12) United States Patent
Whetstone et al.

(10) Patent No.: US 10,052,569 B2
(45) Date of Patent: Aug. 21, 2018

(54) DE-AERATOR FOR A WATER HEATING SYSTEM

(71) Applicants: Stanley Whetstone, Selby (GB); Robert Harris, Teddington (GB)

(72) Inventors: Stanley Whetstone, Selby (GB); Robert Harris, Teddington (GB)

( * ) Notice: Subject to any disclaimer, the term of this patent is extended or adjusted under 35 U.S.C. 154(b) by 421 days.

(21) Appl. No.: 14/271,210

(22) Filed: May 6, 2014

(65) Prior Publication Data

US 2015/0321122 A1    Nov. 12, 2015

(51) Int. Cl.
*B01D 19/00* (2006.01)

(52) U.S. Cl.
CPC ..... *B01D 19/0042* (2013.01); *B01D 19/0057* (2013.01)

(58) Field of Classification Search
CPC ............ B01D 19/0042; B01D 19/0057; B01D 19/00–19/0495
USPC .................................................... 96/205, 216
See application file for complete search history.

(56) References Cited

U.S. PATENT DOCUMENTS

| 2,578,568 A | | 12/1951 | Mayer et al. | |
| 2,706,045 A | * | 4/1955 | Large | B04C 5/13 209/732 |
| 2,710,664 A | | 6/1955 | Blackmore et al. | |
| 2,757,582 A | | 8/1956 | Freeman et al. | |
| 2,790,606 A | | 4/1957 | Morgan et al. | |
| 2,923,151 A | * | 2/1960 | Engle | E21B 49/005 175/206 |
| 3,276,188 A | | 10/1966 | Carlson | |
| 4,248,378 A | | 2/1981 | Carruthers | |
| 4,555,253 A | * | 11/1985 | Hull | B01D 19/0057 210/188 |

(Continued)

FOREIGN PATENT DOCUMENTS

| EP | 1568955 | 8/2005 |
| GB | 918105 | 2/1963 |

(Continued)

OTHER PUBLICATIONS

Interactive Mathematics, http://www.intmath.com/applications-differentiation/8-radius-curvature.php, last visited Sep. 2, 2016.*

*Primary Examiner* — T. Bennett McKenzie
(74) *Attorney, Agent, or Firm* — Kirton McConkie; Evan R. Witt

(57) ABSTRACT

A de-aerator for removing dissolved gasses from water in a water heating system and a water heating system comprising such a de-aerator are disclosed. The de-aerator includes a vessel defining a chamber for receiving water which has been heated by a primary water heater, an inlet through which water can be supplied into the chamber and an outlet through which the water can exit the chamber; and a vent through which gas can exit the chamber. A diameter of the chamber decreases in a direction from the inlet towards the outlet. The chamber side wall being curved and having a non-constant radius of curvature, the radius of curvature being smaller near the outlet than near the inlet, so that water supplied into the chamber is accelerated as it flows from the inlet towards the outlet, to thereby promote de-aeration of the water. De-aeration gasses exit the chamber through the vent.

19 Claims, 10 Drawing Sheets

(56) References Cited

U.S. PATENT DOCUMENTS

| 5,510,019 | A | * | 4/1996 | Yabumoto | B01D 19/0057 |
|---|---|---|---|---|---|
| | | | | | 210/512.1 |
| 6,024,874 | A | * | 2/2000 | Lott | B04C 5/13 |
| | | | | | 209/138 |
| 2010/0019054 | A1 | * | 1/2010 | Whetstone | B01D 19/0042 |
| | | | | | 237/66 |

FOREIGN PATENT DOCUMENTS

| GB | 1498648 | 1/1978 |
|---|---|---|
| GB | 2001740 | 2/1979 |
| WO | 91/08422 | 6/1991 |

\* cited by examiner

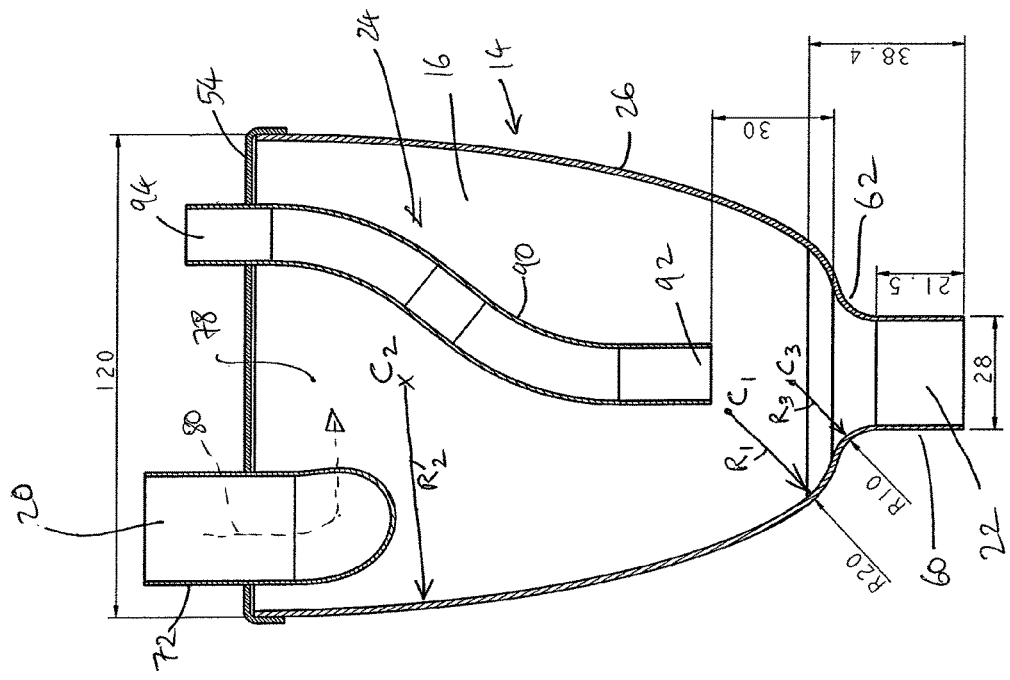
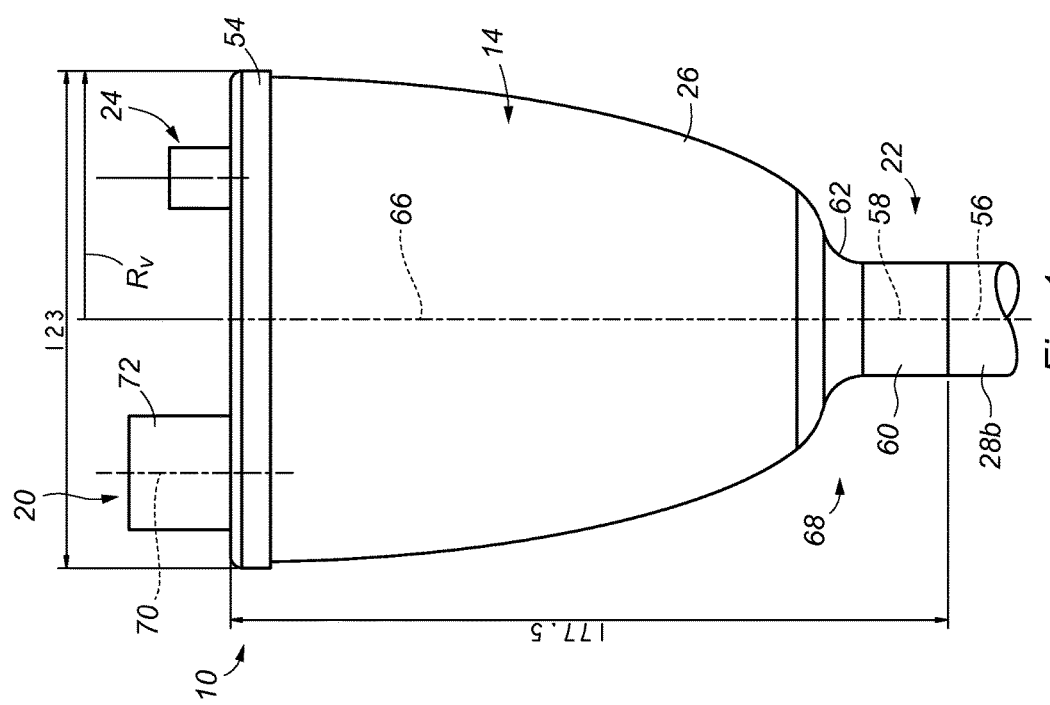
Fig. 2
Fig. 1

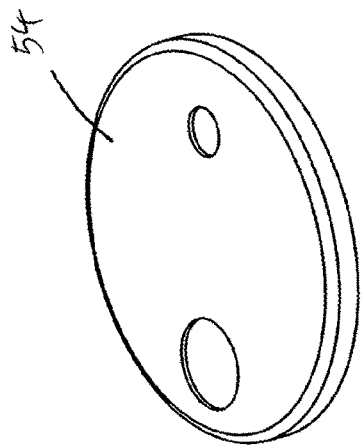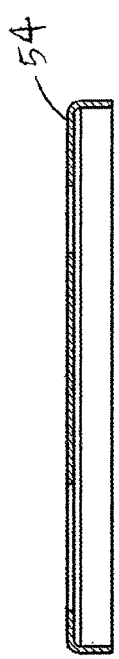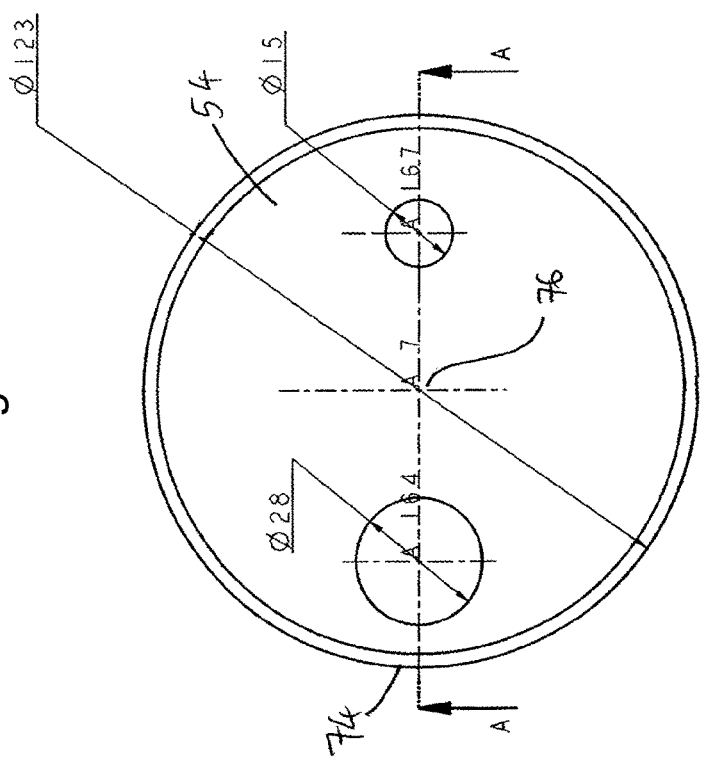
Fig. 6
Fig. 4
Fig. 7
Fig. 5

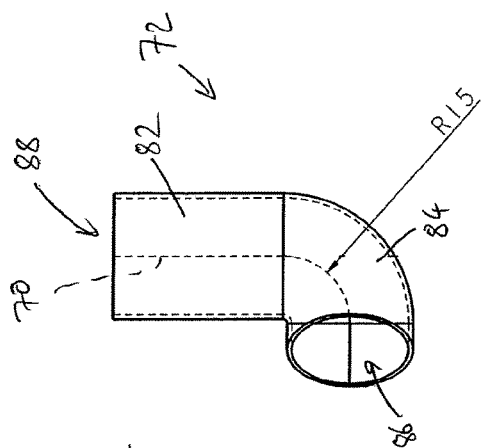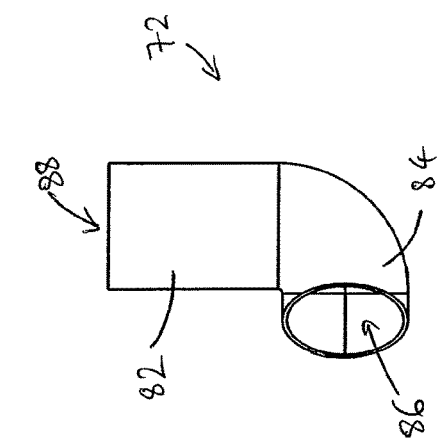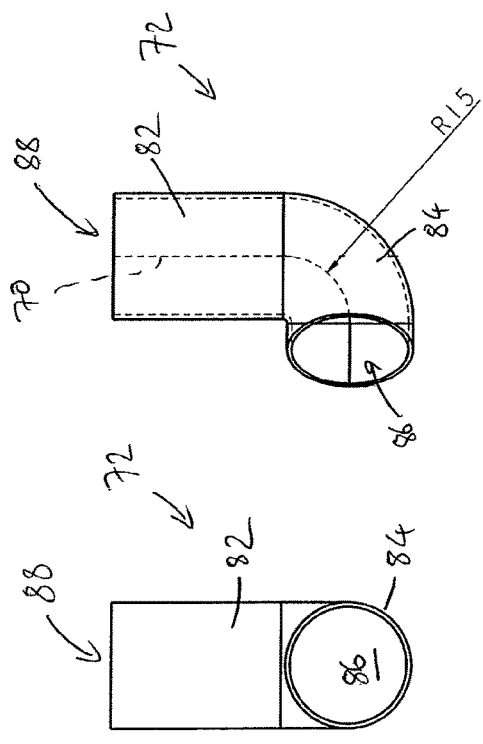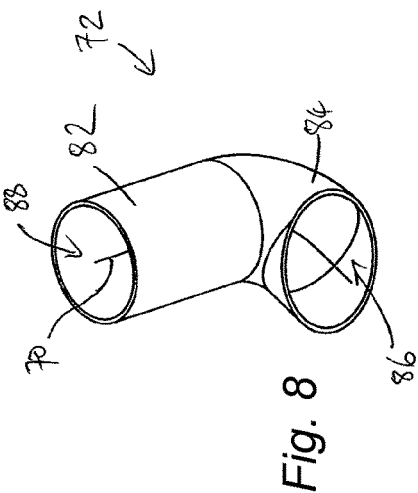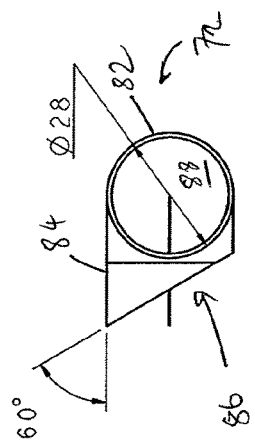

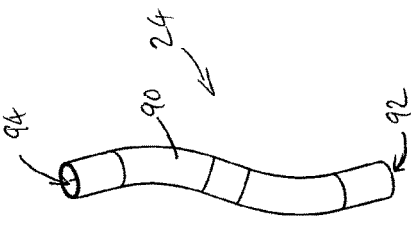
Fig. 13
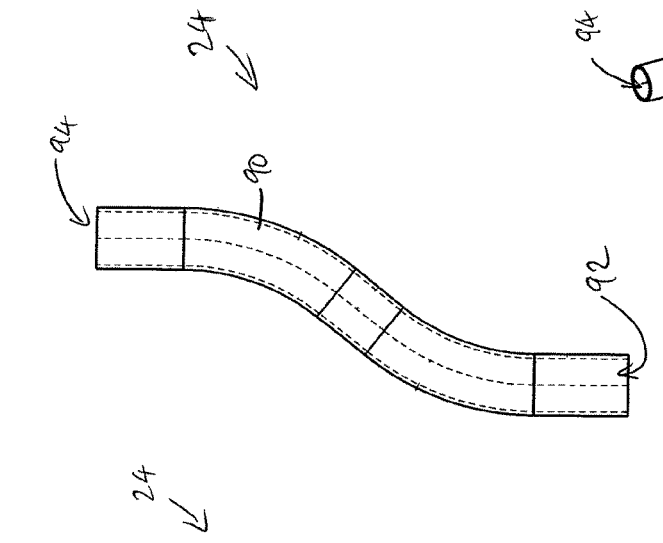
Fig. 17
Fig. 16
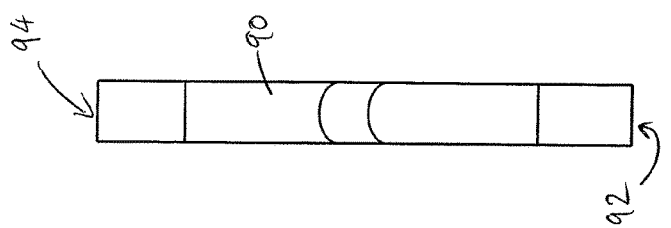
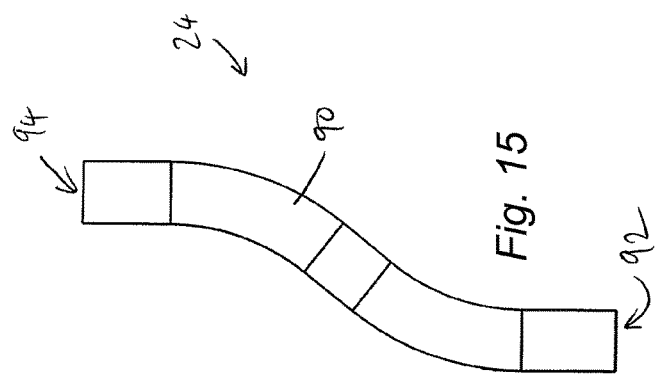
Fig. 15
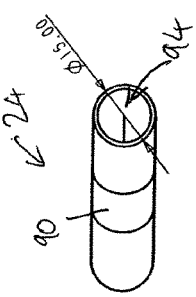
Fig. 14

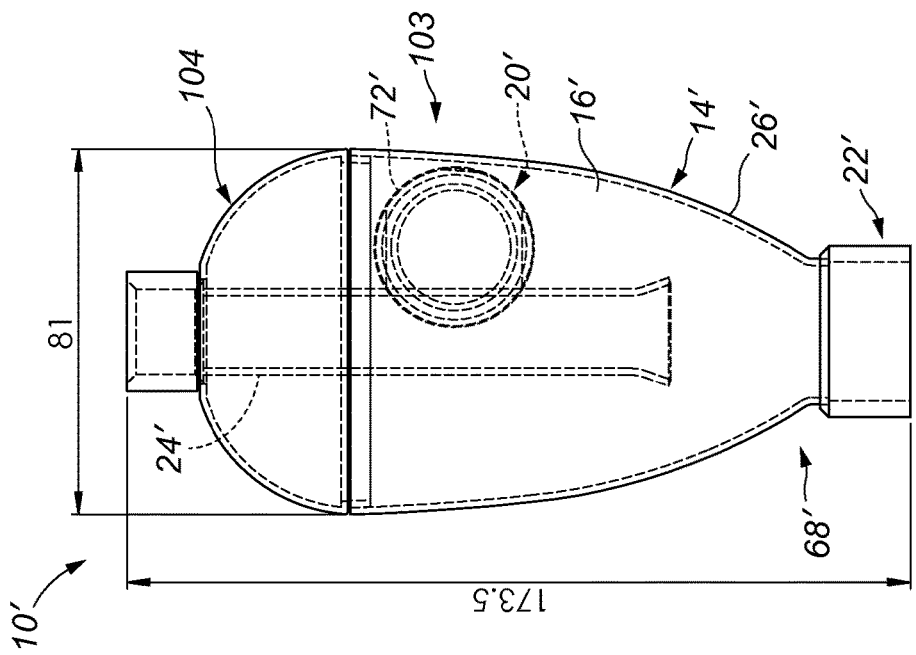
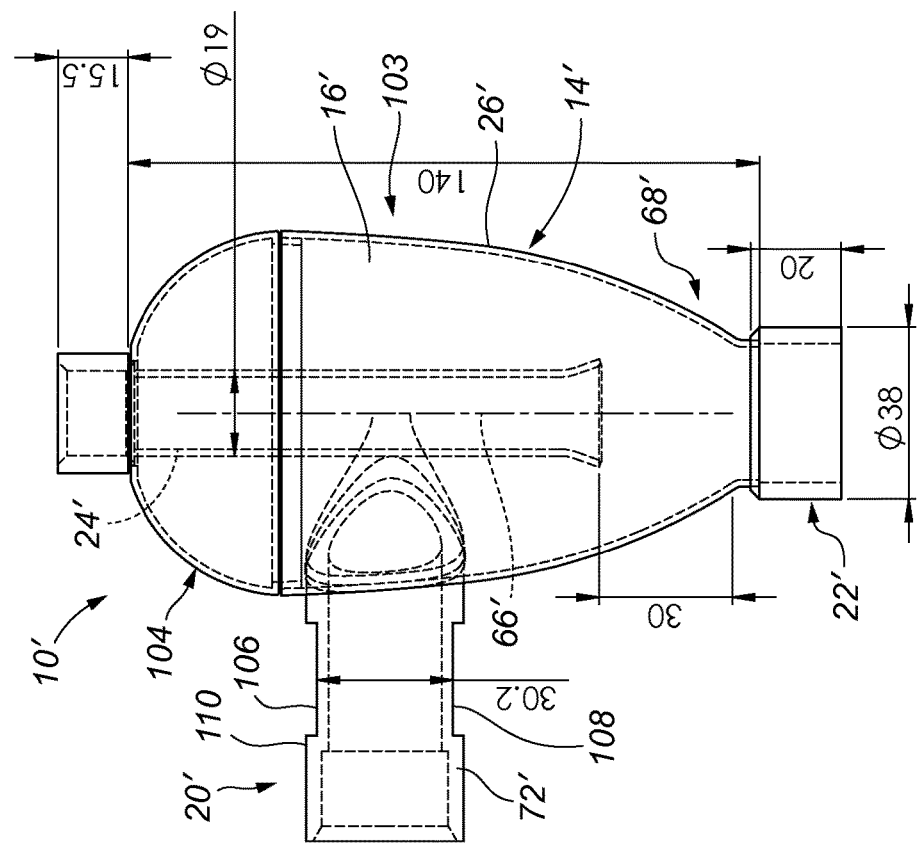

DE-AERATOR FOR A WATER HEATING SYSTEM

FIELD OF THE INVENTION

The present invention relates to a de-aerator for a water heating system. In particular, but not exclusively, the present invention relates to a de-aerator for removing dissolved gasses from water in a water heating system, and to a water heating system comprising such a de-aerator.

BACKGROUND OF THE INVENTION

Water heating systems are employed in both domestic and industrial environments for space heating and/or for supplying hot water for washing purposes. Water heating systems employ a primary heater, which is typically a gas or oil fired boiler. Where the heating system is to be used in a building for space heating purposes, the system comprises a network of space heaters. These space heaters are heat exchangers, and are generally referred to as "radiators". The primary heater is coupled to the radiators in a closed loop by means of a network of pipes, which includes a primary pipe circuit coupled to the boiler, and branch pipes extending from the primary pipe circuit to the radiators. The primary heater is activated to heat water in the primary pipe circuit, which is pumped around the primary pipe circuit and fed to the radiators by the branch pipes.

As the heated water passes around the primary pipe circuit and through the radiators, heat is transferred to the air via the radiators, to warm the building. The heated water flowing from the boiler into the primary pipe circuit is known as the "primary flow", and the water returning to the boiler through the pipe circuit is known as the "primary return". As a result of heat transfer to the radiators, and thermal losses in the pipe network, the water returning to the boiler (the primary return) is at a lower temperature than the water exiting the boiler (the primary flow).

Where the water heating system is also used to provide a source of hot water for washing purposes, a hot water storage vessel or tank is provided in a secondary circuit which receives water from the primary pipe circuit. Water from the primary circuit enters the secondary circuit and passes through a coiled pipe located in the tank. This serves for heating a volume of ambient temperature water that has been charged into the tank. The water in the tank is thus indirectly heated by the primary flow, and the heated water that is outputted from the secondary circuit containing the tank is referred to as the "secondary flow".

Other systems are known in the industry, in particular those of the type which provide a supply of hot water for washing purposes on-demand. In systems of this type, cold water is supplied to the boiler and is heated and supplied directly to a tap (faucet) or taps for discharge. The storage tank is thus dispensed with. Boilers of the type that are used in these systems are typically referred to in Europe as "combination" or "combi" boilers. These systems also serve for heating water in a closed pipe circuit for space heating purposes in the fashion described above. However, other more simple systems are known, which serve merely for providing hot water for washing purposes.

The water which is utilised in water heating systems for space heating purposes contains a relatively large proportion of dissolved air, which is a mixture of a number of different gases. The primary constituents of air are Nitrogen (~78%) and Oxygen (~21%). It has been calculated that the typical proportion of dissolved air in water is around 0.023 g/kg (or around 0.0227 g/liter) for water at a temperature of 25° C. In terms of volume, it is estimated that water at room temperature will contain up to around 2.5% by volume of dissolved air. In other words, 100 liters of water will contain up to around 2.5 liters of dissolved air.

However, the capacity of water to absorb dissolved air decreases with temperature (and increases with pressure). Consequently, when the water in a water heating system is heated, a portion of the air which is dissolved in the water comes out of solution. The gases coming out of solution from the water can form bubbles which are mixtures of different gases. These gases impair the performance of the water heating system.

In particular, with Nitrogen being the largest constituent of air, it has been found that microscopic bubbles of Nitrogen can line the network of pipes and radiators, forming a thermal barrier which reduces the effective transfer of heat to the radiators, thereby impairing performance. Additionally, the bubbles lining the pipes and radiators increase surface friction, and thus the resistance to flow of water through the pipes and radiators. This can result in impaired heating performance, as the flow of heated water to radiators further along the heating system from the boiler may not be sufficient to adequately heat the parts of the building served by those radiators. This typically results in the boiler being operated at a higher capacity than would otherwise be required, leading to increased energy usage and thus costs, and a resultant increase in wear and tear on the boiler. Additionally, a pump used to force the water around the pipes has to operate at a higher work rate, also leading to increased energy usage, costs, and wear and tear. Furthermore, the presence of oxygen in the system can lead to corrosion of the radiators, which are typically of a mild steel material. Finally, the bubbles of gas can become entrained in the water flowing around the primary pipe circuit and the radiators, resulting in unwanted noise.

Attempts have been made to address these problems by removing dissolved air from the water employed in water heating systems. These have included positioning de-aeration vessels (which are typically cylindrical, conical or having a conical base) in the primary pipe circuit so that the hot water flowing around the pipe circuit (and into a secondary circuit containing a hot water storage tank, if used) has to pass through the vessel. Vessels of this type seek to increase the velocity of the fluid, generating a vortex which, as a consequence, reduces the pressure of the fluid. Reducing the pressure of a fluid also reduces its capacity to retain dissolved air. The aim of such vessels is therefore to reduce the pressure of the water so that dissolved air comes out of solution, and can be directed out of the vessel along a dip pipe which communicates with the atmosphere.

In practice however, none of the vessels which have been developed have been found to provide an effective removal of the air which comes out of solution when the water is heated. In particular, it has been found that heating systems employing such vessels do not provide a sufficiently significant improvement in performance to address the deficiencies outlined above. Additionally, it has been found that a significant problem of corrosion of the mild steel radiators still exists, indicating that there remains a significant volume of oxygen in the water in the heating system. It is believed that this is due not only to inefficient removal of dissolved air from the water, but also a peculiar problem associated with the large proportion of Nitrogen found in air. In particular, it is believed that the microscopic bubbles of Nitrogen which come out of solution from the water attract oxygen, and carries the oxygen out of the vessel into the radiators.

One reason for the prior vessels performing inadequately has been found to be their shape. Specifically, in the existing vessels, it has been found that, under many operating conditions, a vortex is set-up which is of a shape that results in a pressure drop which is not consistent or sufficient to provide an effective removal of gases from the water. Also, the microscopic bubbles of Nitrogen which come out of solution from the water do not have sufficient buoyancy to exit the vessel through the dip pipe against the force of the water flowing through the vessel. Furthermore, it has been found that the vortex which is formed actually tends to draw additional air into the vessel, rather than allowing exit of gases that have come out of solution, thus exacerbating the problem. Conically shaped vessels and vessels with conical portions have been found to result in the formation of unstable vortices, and resultant poor performance. Turbulence at the outlet of the vessels can also disrupt the flow and formation of a stable vortex.

It is therefore amongst the objects of the present invention to obviate or mitigate at least one of the foregoing disadvantages.

SUMMARY OF THE INVENTION

According to a first aspect of the present invention, there is provided a de-aerator for use in a water heating system, the de-aerator comprising:
 a vessel defining a chamber for receiving water which has been heated by a primary water heater, an inlet through which water can be supplied into the chamber and an outlet through which the water can exit the chamber; and
 a vent through which gas can exit the chamber;
 wherein:
  a diameter of the chamber decreases in a direction from the inlet towards the outlet; and
  the vessel has a side wall extending between the inlet and the outlet which defines a boundary of the chamber, the side wall being curved and having a non-constant radius of curvature, the radius of curvature being smaller in the region of the outlet than in the region of the inlet;
 so that water supplied into the chamber is accelerated as it flows from the inlet towards the outlet, to thereby promote de-aeration of the water, gasses coming out of solution from the water exiting the chamber through the vent.

In use, the velocity of water flowing through the chamber from the inlet to the outlet progressively increases, due to the shape of the chamber and in particular the shape of the side wall of the vessel. This increase in velocity results in a reduction in the pressure of the water in a direction towards the outlet. This reduction in pressure causes air dissolved in the water to come out of solution, forming bubbles of gas which can be directed out of the chamber through the vent. Additionally, gases which come out of solution as a result of heating of the water by the primary heater can also be directed out of the chamber through the vent.

The de-aerator of the present invention offers numerous advantages over prior de-aerators. In particular, providing a vessel which is shaped to have a decreasing diameter towards the outlet, and which has a side wall with the curvature set out above, is such that the vessel promotes a smooth flow of water from the inlet to the outlet; steady acceleration of the water towards the outlet and thus a steady pressure drop towards the outlet; and the formation of a stable vortex. This has been found to result in a rapid de-aeration of the water on commencement of the flow of water through the vessel. Additionally, the effective removal of dissolved air from the water in the heating system increases the thermal capacity of the system; it may effectively increase the density of the water.

The vessel, in particular the chamber, may be at least partially egg-shaped or ovoid. The side wall may have a shape which generally conforms to the shape of part of the surface of an egg, in particular part of a wall of an egg which extends in a direction from a portion of the egg of greatest external diameter towards an axial end of the egg, which end is the end adjacent the portion of the egg having the smallest radius of curvature. The vessel may have a main axis and may be symmetrical about the main axis.

The side wall may have a radius of curvature which progressively decreases in a direction from the inlet towards the outlet. This may promote smooth flow, steady acceleration, and formation of a stable vortex, as discussed above. The rate of change of the radius of curvature may increase in a direction towards the outlet. Said side wall may extend at least between an opening of the inlet and an opening of the outlet.

The curvature of the side wall and thus of the chamber may be determined by the diameter of the vessel, and the way in which the diameter changes in a direction from the inlet towards the outlet. The vessel, or the portion of the vessel defined by the side wall, may have a length, and the diameter may decrease in a direction from a top of the vessel (or the top of the portion of the vessel defined by the side wall) to a bottom of the vessel. At a position which is 1/6 of the distance along the length of the vessel taken from its top, a ratio of the diameter of the vessel relative to the length at that position may be from about 4.250 to about 4.260. At a position which is 2/6 of the distance along said length, a ratio of the diameter of the vessel relative to the length at that position may be from about 2.040 to about 2.050. At a position which is 3/6 of the distance along said length, a ratio of the diameter of the vessel relative to the length at that position may be from about 1.260 to about 1.270. At a position which is 4/6 of the distance along said length, a ratio of the diameter of the vessel relative to the length at that position may be about 0.820 to about 0.830. At a position which is 5/6 of the distance along said length, a ratio of the diameter of the vessel relative to the length at that position may be about 0.470 to about 0.480. At a position which is at the full length of the vessel taken from its top, a ratio of the diameter of the vessel relative to the length at that position may be about 0.170 to about 0.180. A vessel having such a shape, and thus the chamber, may be generally egg-shaped or ovoid.

Reference is made to the top and bottom of the vessel. Typically, the vessel will be positioned so that a main axis is vertically oriented, and references to the top and bottom of the vessel should be interpreted accordingly.

It will also be understood that the vessel may have a further portion above the inlet, say where the inlet is located between an axially upper extent of the vessel and a lower extent. The side wall referred to above is the portion of the vessel wall extending between the inlet and the outlet, and the top of the vessel referred to above would then be the portion of the vessel in the region of the inlet.

The side wall of the vessel may have radii of curvature which are positive, taken with reference to centres of curvature located within the chamber. Thus the portion of the vessel defined by the side wall may be said to be generally convex in shape. The radius of curvature of the side wall in the region of the outlet, relative to a radius of the vessel, may be about 1:2, may be between about 1:2 and about 1:3, and is preferably about 1:3. For example, in a vessel of radius 60 mm, the radius of curvature of the side wall in the region of the outlet may be about 30 mm, may be between 30 mm and 20 mm, and is preferably about 20 mm.

The de-aerator may comprise a flow conduit coupled to the vessel outlet so that fluid exiting the outlet flows through the flow conduit. The flow conduit may have a conduit axis, and may be positioned so that it is coaxial with the vessel outlet, or may have a portion which is positioned so that it is coaxial with the vessel outlet. The flow conduit (or said portion of the flow conduit) may have a length of at least about 200 mm, optionally at least about 250 mm, and may have a length of at least about 300 mm. In a preferred embodiment, the flow conduit may have a length of at least about 600 mm. It has been found that the provision of such a flow conduit or conduit portion is beneficial in that it improves the stability of a vortex which is formed when water flows through the chamber, and thus de-aeration of the water. In particular, the vessel is typically positioned so that the outlet is in a vertical orientation, and so the flow conduit or conduit portion, which is coaxial with the outlet, is similarly vertically oriented. Thus making the flow conduit/conduit portion at least about 300 mm, and preferably at least about 600 mm, provides a vertical drop of at least that dimension before there is any subsequent change in angle of the flowing water (such as for direction in a lateral or horizontal direction towards a space heater). This produces particularly good results.

The vessel may comprise an outlet conduit which defines the vessel outlet, and a transition portion extending between the outlet conduit and the side wall of the vessel. The transition portion may be shaped to promote the smooth flow of water through the outlet without resultant turbulence which could otherwise disrupt the flow. The transition portion may be curved, and may have a diameter which decreases in a direction from the side wall towards the outlet conduit. The radius of curvature of the transition portion may be constant, and may be negative, taken with reference to a centre of curvature located within the chamber. Thus a wall of the transition portion of the vessel may be said to be generally concave in shape, in cross-section. The radius of curvature of the transition portion, relative to a radius of the vessel, may be about 1:3, may be about 1:4, may be about 1:5, and is preferably about 1:6. For example, in a vessel of radius 60 mm, the radius of curvature of the transition portion may be about 20 mm, may be about 15 mm, may be about 12 mm, and is preferably about 10 mm.

The outlet may have an outlet axis, and may be positioned so that the outlet axis is parallel to a main axis of the vessel. The outlet may be coaxial with a main axis of the vessel. The outlet may be positioned on an axial end of the vessel, which end may be a lowermost end of the vessel, in use. Typically, the vessel will be positioned in use so that the outlet is located lowermost, to promote the flow of water through the chamber and formation of a vortex. Accordingly, the vessel will typically be positioned in a generally vertical orientation.

The inlet may be shaped to direct water into the chamber generally tangentially to an internal surface of the chamber, in particular to an internal surface of the side wall. This may facilitate the formation of a vortex within the chamber, by promoting flow of water in a generally helical path within the chamber from the inlet towards the outlet. The inlet may comprise an entry portion through which water is fed into the inlet, and an exit portion through which water flows into the chamber. The exit portion may define an exit which is shaped to direct the water generally tangentially. The entry and exit portions may be disposed at non-parallel angles relative to one another. The entry portion may define an entry, and may be positioned so that an axis of the entry portion is parallel to a main axis of the vessel (and so not coaxially oriented). This may facilitate supply of water into the chamber from a conduit which is coaxial with the entry portion of the inlet, without requiring the water to go through a change of direction for flow into the inlet. The entry portion may be positioned so that its axis is parallel to and spaced from the main axis of the vessel. The inlet may be provided in a lid or cap of the vessel, and may be positioned between a radially outer edge of the lid and a centre of the lid.

The chamber may have an upper portion and a lower portion. The inlet may open on to the upper portion of the chamber. The outlet may open on to the lower portion of the chamber. The upper portion of the chamber may be of a greater diameter than the lower portion of the chamber, and may be of greater diameter than a remainder of the chamber. The inlet may open on to an intermediate portion of the chamber, which is between the upper portion and the lower portion. The intermediate portion of the chamber may be of greater diameter than either the upper or lower portions.

The vent may comprise a vent conduit or pipe having an inlet located in the chamber and an outlet located externally of the chamber, for directing gasses out of the chamber. The inlet may be positioned so that, in use, the inlet is submerged in the water in the chamber. This may prevent exposure of the inlet which could otherwise result in air being drawn into the chamber through the vent conduit. The inlet may be positioned so that it is coaxial with a main axis of the vessel. In this way, the vent conduit inlet may be located in the centre of the vessel, and may therefore be located at the centre of a vortex which is created when water flows through the vessel. This may facilitate discharge of gas through the vent conduit. The vent conduit inlet may be positioned generally in the region of the outlet. In use, bubbles of gas coming out of solution from the water will tend to be carried down with the water towards the outlet, and generally radially inwardly of the vessel (in particular into the centre of a vortex which may be formed in the tank). Positioning the vent conduit inlet in the region of the outlet may promote the escape of these gases from the chamber. A cross-sectional area of the vent conduit inlet may be greater than a cross-sectional area of the outlet. This may promote flow of gases into and along the conduit, without requiring a conduit which has a large outlet, relative to a diameter of the vessel.

The de-aerator may comprise a magnetic element for removing ferrous materials from the water. The magnetic element may be positioned below the outlet of the vessel, and may be located in the outlet conduit or the flow conduit.

According to a second aspect of the present invention, there is provided a water heating system comprising:
  a primary water heater;
  a primary water circuit having a primary water conduit coupled to the primary heater so that water in the primary water conduit flows in a closed loop through the primary water heater;
  at least one space heater arranged in fluid communication with the primary water conduit; and
  a de-aerator according to the first aspect of the present invention;

in which the de-aerator is in fluid communication with the primary water conduit so that the water flowing in the primary water conduit flows through the de-aerator, which operates to de-aerate the water.

The volume of the de-aerator chamber as a proportion of the total volume of water in the heating system (which may be the volume of water in the primary water conduit, the at least one space heater and any associated branch conduits) may be no more than about 1%, optionally no more than about 0.5%, and preferably no more than about 0.3% of the total volume. It has been found that there are benefits in terms of the performance of the de-aerator where the volume of the de-aerator chamber as a proportion of the total volume of water in the heating system is in this range, preferably no more than about 0.3%. The volume of the chamber may be no more than about 400 ml, may be no more than about 350 ml, may be no more than about 300 ml, and preferably is about 280 ml.

The de-aerator may be positioned downstream of the primary heater, and may be upstream of the at least one space heater. In this way, the water is de-aerated prior to entering the at least one space heater. The de-aerator may be positioned downstream of a pump which is used to force water around the primary conduit, and upstream of a valve or valves which are used to control the flow of fluid in the system.

The system may comprise a water storage vessel provided in a secondary circuit which is in fluid communication with the primary water conduit, water flowing from the primary circuit into the secondary circuit to heat ambient water contained within the storage vessel. The de-aerator may be positioned upstream of the water storage vessel.

The system may comprise a secondary circuit having a secondary conduit coupled to the storage vessel so that water in the secondary conduit flows in a closed loop through the storage vessel, and at least one tap or faucet coupled to the secondary conduit for the discharge of heated water from the secondary circuit. The system may comprise a second de-aerator according to the first aspect of the present invention coupled in the secondary circuit.

According to a third aspect of the present invention, there is provided a water heating system comprising:
  a primary water heater;
  a primary water circuit having a primary water conduit coupled to the primary heater so that water in the primary water conduit flows in a closed loop through the primary water heater;
  a water storage vessel provided in a secondary circuit which is in fluid communication with the primary water conduit, water flowing from the primary circuit into the secondary circuit to heat ambient water contained within the storage vessel;
  a further secondary circuit having a secondary conduit coupled to the storage vessel so that water in the secondary conduit flows in a closed loop through the storage vessel;
  at least one tap or faucet coupled to the secondary conduit for the discharge of heated water from the further secondary circuit; and
  a de-aerator according to the first aspect of the present invention;
  in which the de-aerator is in fluid communication with the secondary conduit of the further secondary circuit so that the water flowing in the secondary conduit flows through the de-aerator, which operates to de-aerate the water.

The further secondary circuit may comprise a pump for continuously pumping the water around the circuit, so that the water which is discharged from the at least one tap or faucet is always hot. The de-aerator may act to de-aerate the water in the further secondary circuit, providing the advantages discussed above.

According to a fourth aspect of the present invention, there is provided a method of retro-fitting a de-aerator in an existing water heating system, the water heating system comprising a primary water heater, a primary water conduit coupled to the primary heater so that water in the primary water conduit flows in a closed loop through the primary water heater, and at least one space heater arranged in fluid communication with the primary water conduit, the method comprising the steps of:
  coupling the de-aerator of the first aspect of the invention to the primary water conduit at a position which is downstream of the primary heater and upstream of the at least one space heater; and
  arranging the de-aerator so that water flowing in the primary water conduit enters the inlet of the de-aerator vessel and flows through the chamber to the outlet so that the water is de-aerated during its passage through the chamber.

The method may comprise removing a portion of the existing primary water conduit and positioning the de-aerator in its place. The step of removing the portion of the conduit may comprise making spaced upstream and downstream cuts in the conduit, to divide the conduit into upstream and downstream portions, and coupling the inlet of the de-aerator to the upstream portion and the outlet of the de-aerator to the downstream portion. The de-aerator may be coupled using suitable connecting conduits.

BRIEF DESCRIPTION OF THE DRAWINGS

Embodiments of the present invention will now be described, by way of example only, with reference to the accompanying drawings, in which:

FIG. 1 is a side view of a de-aerator for use in a heating system in accordance with an embodiment of the present invention;

FIG. 2 is a longitudinal cross-sectional view of the de-aerator shown in FIG. 1;

FIGS. 4, 5 and 6 are perspective, plan and side views, respectively, of a lid of the de-aerator of FIG. 1;

FIG. 7 a cross-sectional view of the lid taken in the direction of the arrows A-A of FIG. 5;

FIGS. 8, 9 and 10 are perspective, plan and side views, respectively, of an inlet of the de-aerator shown in FIG. 1;

FIGS. 11 and 12 are views of the inlet which are similar to FIG. 10, but taken from different angles;

FIGS. 13, 14 and 15 are perspective, plan and side views, respectively, of a vent of the de-aerator shown in FIG. 1;

FIGS. 16 and 17 are views similar to FIG. 15 but taken from different angles;

FIGS. 19, 20, 21 and 22 are front, right side, plan and perspective views, respectively, of a de-aerator for use in a heating system in accordance with another embodiment of the present invention;

DETAILED DESCRIPTION OF THE DRAWINGS

Figure 3:
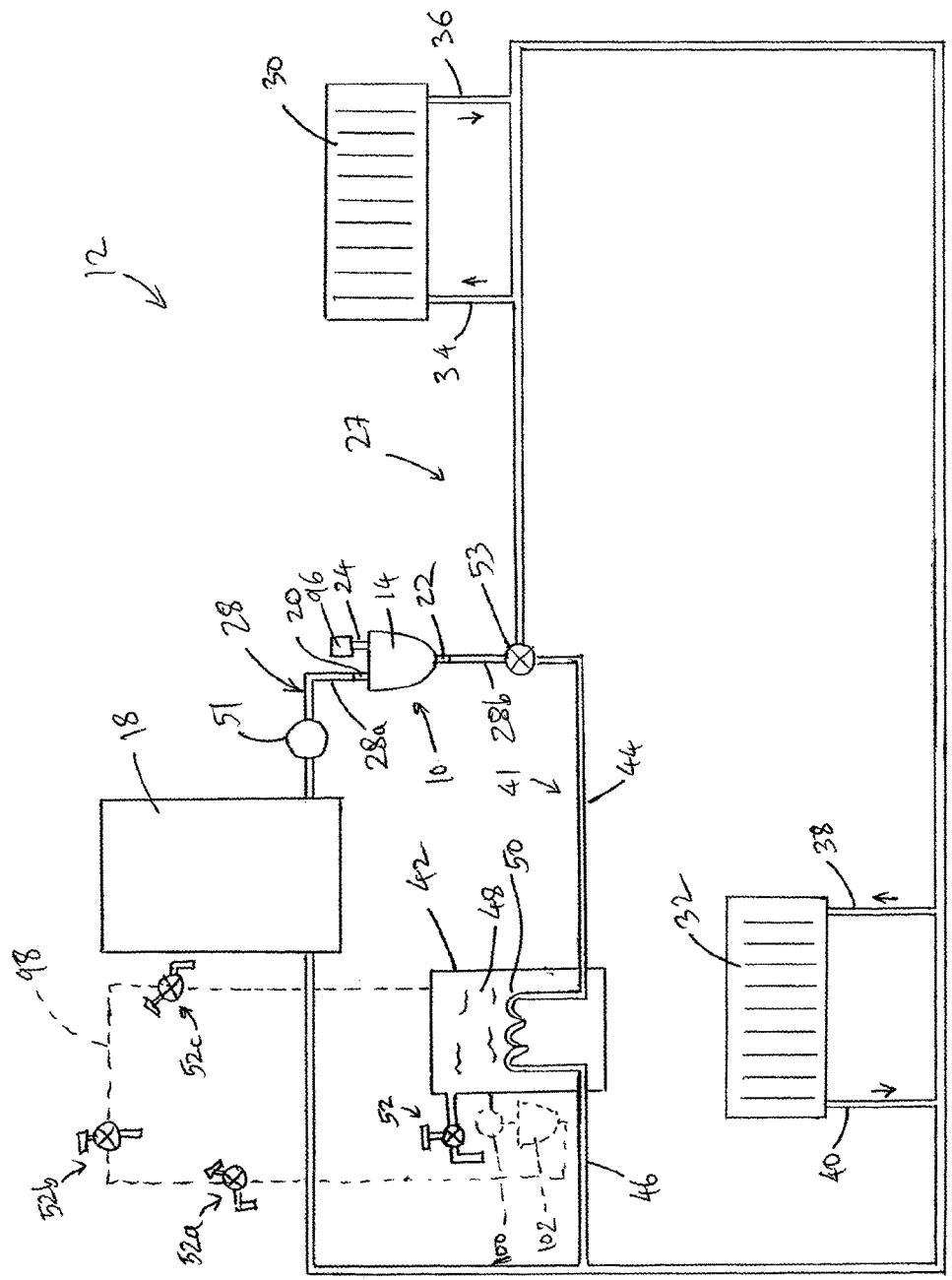
FIG. 3 is a schematic illustration of a water heating system, in accordance with an embodiment of the present invention, incorporating the de-aerator of FIG. 1.

Turning firstly to FIG. 1, there is shown a side view of a de-aerator for use in a water heating system, in accordance with an embodiment of the present invention, the de-aerator indicated generally by reference numeral 10. The de-aerator 10 is also shown in the longitudinal cross-sectional view of FIG. 2, and in FIG. 3, which is a schematic illustration of a water heating system 12 incorporating the de-aerator 10.

The de-aerator 10 generally comprises a vessel 14 defining a chamber 16 for receiving water which has been heated by a primary water heater 18. The vessel 14 has an inlet 20 through which water can be supplied into the chamber 16, an outlet 22 through which water can exit the chamber, and a vent 24 through which gas can exit the chamber. A diameter of the chamber 16 decreases in a direction from the inlet 20 towards the outlet 22. The vessel 14 has a side wall 26 extending between the inlet 20 and the outlet 22, which defines a boundary of the chamber 16. The side wall 26 is curved and has a non-constant radius of curvature, the radius of curvature being smaller in the region of the outlet 22 than in the region of the inlet 20. This is illustrated in FIG. 2, where a radius of curvature $R_1$ of the side wall 26 in the region of the outlet 22 is smaller than a radius of curvature $R_2$ in the region of the inlet 20. In this way, water supplied into the chamber 16 is accelerated as it flows from the inlet 20 towards the outlet 22, to thereby promote de-aeration of the water. Gasses which come out of solution from the water exit the chamber 16 through the vent 24. The side wall 26 effectively has a radius of curvature which progressively decreases in a direction from the inlet 20 towards the outlet 22. The rate of change of the radius of curvature may increase in a direction towards the outlet 22.

In more detail, in use, the velocity of water flowing through the chamber 16 from the inlet 20 to the outlet 22 progressively increases, due to the shape of the chamber and in particular the shape of the side wall 26 of the vessel 14. This increase in velocity results in a reduction in the pressure of the water in a direction towards the outlet 22. This reduction in pressure causes air dissolved in the water to come out of solution, forming bubbles of gas which can be directed out of the chamber 16 through the vent 24. Additionally, gases which come out of solution as a result of heating of the water by the primary heater 18 can also be directed out of the chamber 16 through the vent 24.

The de-aerator of the present invention offers numerous advantages over prior de-aerators. In particular, shaping the vessel 14 so that it has a decreasing diameter towards the outlet 22, and so that the side wall 26 has the curvature set out above, is such that the vessel 14 promotes a smooth flow of water from the inlet 20 to the outlet 22; steady acceleration of the water towards the outlet 22 and thus a steady pressure drop towards the outlet; and the formation of a stable vortex. This has been found to result in a rapid de-aeration of the water on commencement of the flow of water through the vessel 14. Additionally, the effective removal of dissolved air from the water in the heating system 12 increases the thermal capacity of the system; it may effectively increase the density of the water.

The shape of the vessel 14 is such that it gradually funnels the water into a vortex. In the resulting pressure drop, Nitrogen which comes out of solution from the water forms bubbles which enlarge to a size which is such that the bubbles have sufficient buoyancy to rise against the pumping velocity of water through the vessel 14, so that they can escape through the vent 26. Bubbles of Nitrogen and Oxygen also cluster together, to form bigger bubbles, which accelerates the process of eliminating dissolved air from the system 12. Tests of a heating system employing the de-aerator 10 have shown that, after only one week of use, the proportion of dissolved air in the system was reduced from a starting level of around 8 to 9 ppm to just 0.2 ppm. Tests of prior de-aerators of the type described above provide a reduction to, at best, around 1.5 ppm, which was not found to be sufficient to address the disadvantages discussed above, and in particular which was found to still result in corrosion. More detailed test results will be discussed below.

The water heating system 12 incorporating the de-aerator 10 will now be described in more detail. The primary heater 18 is of a conventional type, and is typically a gas or oil-fired boiler. The system 12 comprises a primary water circuit 27 having a conduit 28 coupled to the boiler 18 so that water in the primary water conduit flows in a closed loop through the boiler. At least one space heater is arranged in fluid communication with the boiler 18 and, in the illustrated embodiment, two space heaters in the form of heat exchangers known as radiators 30 and 32 are provided.

The radiators 30 and 32 are coupled to the primary water conduit 28 by means of respective pairs of branch pipes or conduits 34, 36 and 38, 40. The radiators 30 and 32 serve for heating a room or rooms of a building (not shown) in a fashion which is well known in the art, heated water being supplied into the radiators via the primary water conduit 28 and the branch pipes 34, 38 (as indicated by the arrows in FIG. 2) and returning to the primary conduit through the branch pipes 36, 40. In the illustrated embodiment, the system 12 additionally comprises a secondary circuit 41 including a hot water storage vessel 42, which is in fluid communication with the primary water conduit 28 by means of secondary pipes or conduits 44 and 46 so that the primary flow is diverted into the secondary circuit. The vessel 42 contains a volume of ambient temperature water 48 which is heated by the primary flow of water passing through from the inlet pipe 44, through a heating coil 50. A secondary flow of hot water can therefore be drawn off the storage vessel 42 for washing and other purposes, by means of a number of taps (or faucets), one of which is shown and given the reference numeral 52.

In an alternative, the secondary flow of water may be drawn off to feed any other object that can be provided in the water heating system 12. Indeed, it will be understood that the de-aerator 10 has a utility in providing de-aerated water to any object in a water heating system, be it on the (closed) primary circuit 27 or in the secondary circuit 41.

The de-aerator 10 is arranged so that it is in fluid communication with the primary water conduit 28, so that the water flowing in the primary conduit flows through the de-aerator, which operates to de-aerate the water. In particular and as can be seen in FIG. 3, a portion 28a of the primary conduit 28 is coupled to the vessel inlet 20, and the vessel outlet 22 is coupled to a portion 28b of the conduit, so that water flowing in the circuit around the primary conduit from the boiler 18 to the radiators 30, 32 and hot water storage vessel 42 flows through the de-aerator 10. The de-aerator 10 is thus positioned so that it is downstream of the boiler 18 but upstream of the radiators 30, 32 and storage vessel 42. In this way, the water is de-aerated prior to flowing on into the radiators 30, 32 and through the heating coil 50 in the storage vessel 42. This offers an advantage in terms of removing dissolved oxygen from the system 12 prior to the water entering the radiators 30, 32 (which are typically of a mild steel), reducing a risk of corrosion. The de-aerator 10 is typically located downstream of a pump 51 which drives water around the primary circuit, and upstream of a valve 53 which controls the flow of water around the primary circuit to the radiators 30 and 32, and/or through the secondary circuit 41 to the hot water storage vessel 42.

Figure 18:
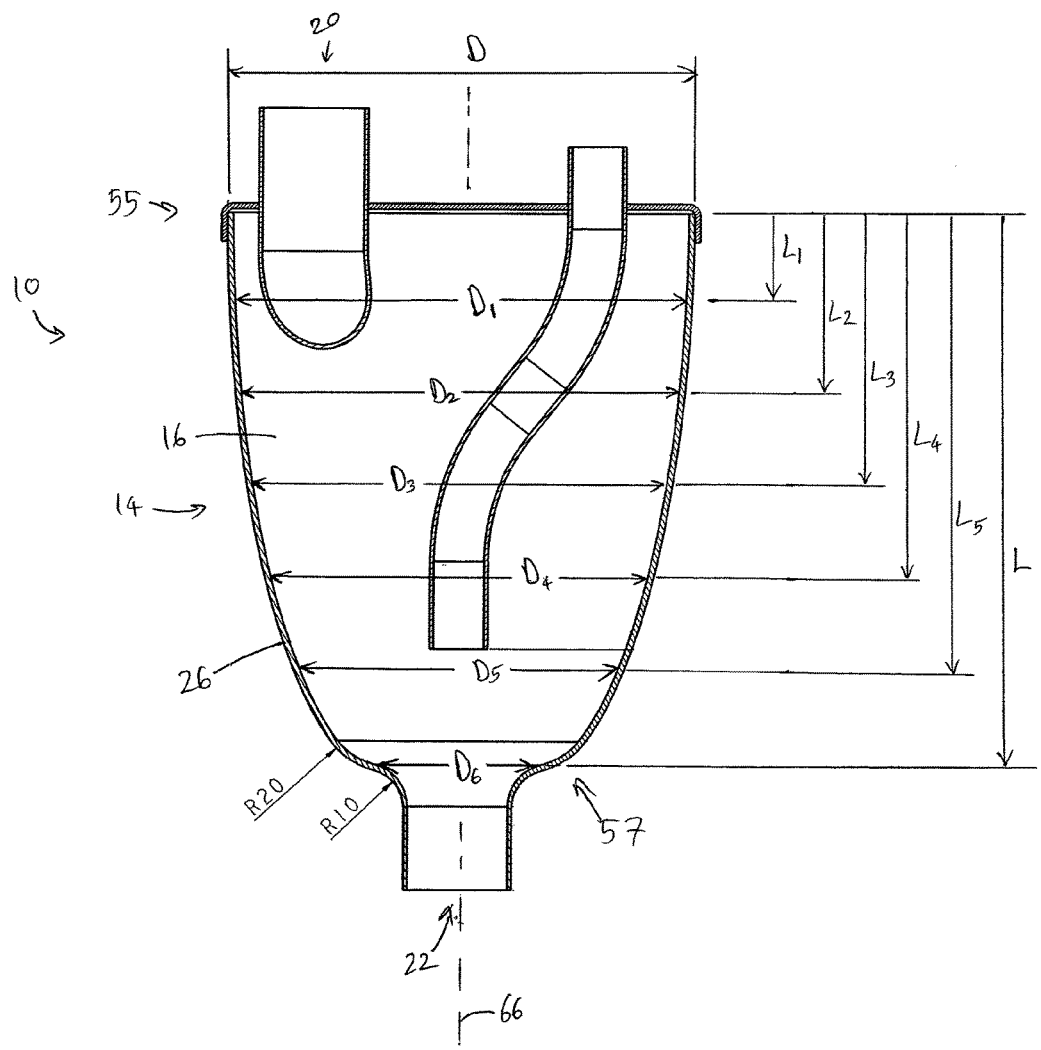
FIG. 18 is a longitudinal cross-sectional view of the de-aerator shown in FIG. 1, similar to the view of FIG. 2, but which shows a relationship between a diameter and length of the de-aerator.
Figure 22:
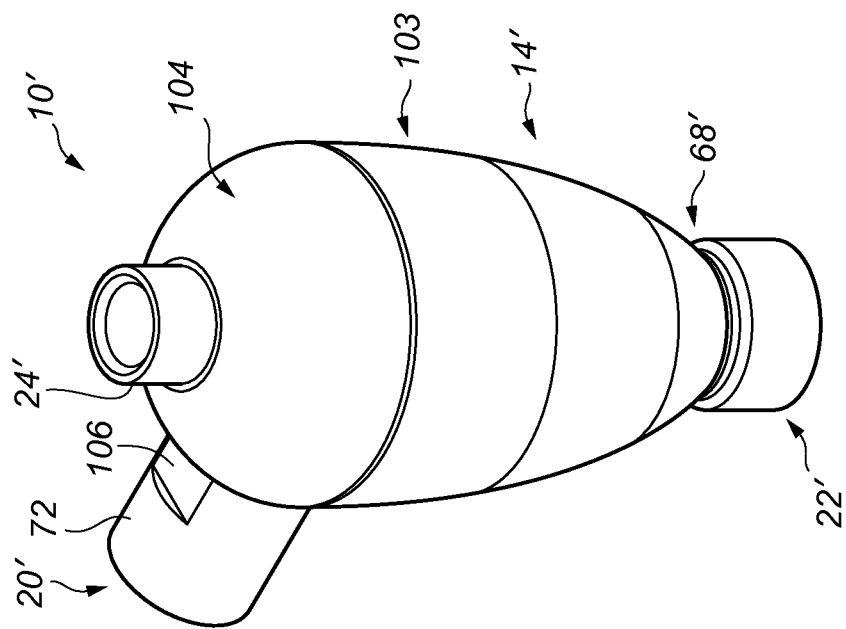

The de-aerator 10 will now be described in more detail, with reference also to FIGS. 4 to 18. FIGS. 4, 5 and 6 are perspective, plan and side views, respectively, of an end cap or lid 54 of the de-aerator, and FIG. 7 is a cross-sectional view of the lid taken in the direction of the arrows A-A of FIG. 5. FIGS. 8, 9 and 10 are perspective, plan and side views, respectively, of the inlet 20, and FIGS. 11 and 12 are views similar to FIG. 10 but taken from different angles. FIGS. 13, 14 and 15 are perspective, plan and side views, respectively, of the vent 24, and FIGS. 16 and 17 are views similar to FIG. 15 but taken from different angles. FIG. 18 is a sectional view of the de-aerator 10 shown in FIG. 1, which is similar to FIG. 2, but which shows a relationship between a diameter and length of the vessel 14.

The vessel 14, and thus the chamber 16, is in effect at least partially egg-shaped or ovoid, the side wall 26 having a shape which generally conforms to the shape of part of the surface of an egg, in particular part of a wall of an egg which extends in a direction from a portion of the egg of greatest external diameter towards an axial end of the egg, which end is the end adjacent the portion of the egg having the smallest radius of curvature. The side wall 26 has a curvature whose shape is determined according to its diameter and the way in which the diameter changes along the length of the chamber 16 in a direction from the inlet towards the outlet.

In the illustrated embodiment, the chamber 16 defined by the side wall 26 has a length L, and the diameter decreases in a direction from a top 55 of the chamber to a bottom 57 of the chamber. The curvature of the side wall 26, and thus of the chamber 16, is determined by the diameter of the chamber, and the way in which the diameter changes in a direction from the inlet 20 towards the outlet 22. The chamber 16 is constructed so as to be generally egg-shaped by careful control of the chamber diameter.

Optimised de-aeration effects may be achieved by dimensioning the chamber 16 as follows. In the illustrated example, the chamber 16 has been divided into six equal sections (FIG. 18) in planes which are perpendicular to a main axis 66 of the vessel. The chamber 16 is symmetrical about the axis 66. At a position $L_1$ which is ⅙ of the distance along the length L of the chamber 16, taken from its top, a ratio of the diameter $D_1$ of the chamber relative to the length at that position is from about 4.250 to about 4.260, and in particular is about 4.260. At a position $L_2$ which is 2/6 of the distance along said length L, a ratio of the diameter $D_2$ of the chamber relative to the length at that position is from about 2.040 to about 2.050, and in particular is about 2.050. At a position $L_3$ which is 3/6 of the distance along said length L, a ratio of the diameter $D_3$ of the chamber relative to the length at that position is from about 1.260 to about 1.270, and in particular is about 1.260. At a position $L_4$ which is 4/6 of the distance along said length L, a ratio of the diameter $D_4$ of the chamber relative to the length at that position is from about 0.820 to about 0.830, and in particular is about 0.820. At a position $L_5$ which is 5/6 of the distance along said length L, a ratio of the diameter $D_5$ of the chamber relative to the length at that position is from about 0.470 to about 0.480, and in particular is about 0.480. At a position which is at the full length L of the chamber taken from its top, a ratio of the diameter $D_6$ of the chamber relative to the length at that position is from about 0.170 to about 0.180, and in particular is about 0.180. The side wall 26 extends in a smooth curve between the upper end 55 of the chamber 16 and the lower end 57. A chamber having such a shape is generally egg-shaped or ovoid.

In the illustrated embodiment, the vessel 14 has a maximum outer diameter of 120 mm. The thickness of the sidewall 26 is 1.5 mm, so the maximum internal diameter of the vessel 16 (and thus the maximum diameter of the chamber) is around 117 mm. The vessel 16 has a length L between the inlet 20 and the outlet 22 of 110 mm, and so the lengths $L_1$ to $L_5$ are, respectively, 18.33 mm; 36.67 mm; 55 mm; 73.33 mm; and 91.67 mm Using the diameter/length ratios set out above, the respective diameters $D_1$ to $D_6$ of the chamber 16 can therefore be calculated to be 78.00 mm; 75.00 mm; 69.50 mm; 60.30 mm; 44.00 mm; and 19.70 mm Bearing in mind the thickness of the side wall 26, the diameters of the chamber 16 at these positions can then be determined.

The side wall 26 of the vessel 14 has radii of curvature which are positive, taken with reference to centres of curvature located within the chamber, as indicated by the example radii $R_1$ and $R_2$ discussed above, each of which have centres $C_1$ and $C_2$ in the chamber 16. Thus the portion of the vessel 14 defined by the side wall 26 can be said to be generally convex in shape in cross-section, in that it curves outwardly. The radius of curvature $R_1$ of the side wall 26 in the region of the outlet, relative to a maximum radius of the vessel, is about 1:3. In the illustrated embodiment, the vessel 14 has a radius $R_v$ of around 60 mm, and so the radius of curvature $R_1$ is around 20 mm. The radius of curvature of the side wall 26 is non-constant, and is greatest in the region of the outlet 22.

The volume of the de-aerator chamber 16 as a proportion of the total volume of water in the heating system 12 (which is the volume of water in the primary water circuit and thus the conduit 28, radiators 30, 32 and secondary circuit 41) is no more than about 1%, optionally no more than about 0.5%, and preferably no more than about 0.3% of the total volume. It has been found that there are benefits in terms of the performance of the de-aerator 10 where the volume of the de-aerator chamber 16 as a proportion of the total volume of water in the heating system 12 is in this range, preferably no more than about 0.3%. The volume of the chamber may be no more than about 400 ml, may be no more than about 350 ml, may be no more than about 300 ml, and in the illustrated embodiment is about 280 ml.

The de-aerator 10 also comprises a flow conduit coupled to the vessel outlet 22. In this instance, the flow conduit is the portion 28b of the primary flow conduit shown in FIG. 3. In this way, water exiting the outlet 22 flows through the flow conduit 28b. Part of the flow conduit 28b is shown in FIG. 1, and has a conduit axis 56. The flow conduit 28b is positioned so that it is coaxial with the vessel outlet 22, and so is positioned so that the flow conduit axis 56 is coaxial with an axis 58 of the outlet 22. In the illustrated embodiment, the flow conduit 28b has a length of at least about 600 mm. It has been found that the provision of such a flow conduit or conduit portion is beneficial in that it improves the stability of a vortex which is formed when water flows through the chamber 16, and thus de-aeration of the water. In particular, the vessel 14 is typically positioned so that the outlet 22 is in a vertical orientation, and so the flow conduit 28b, which is coaxial with the outlet, is similarly vertically oriented. Making the flow conduit 28b at least about 600 mm provides a vertical drop of at least that dimension before there is any subsequent change in angle of the flowing water, such as for direction in a lateral or horizontal direction towards the radiator 30, as shown in FIG. 3. Reasonable results can also be achieved with a pipe length (and so drop) of around 300 mm, but it has been found that a length of at least about 600 mm provides particularly good results.

The vessel 14 also comprises an outlet conduit 60 which defines the vessel outlet 22, and a transition portion 62 extending between the outlet conduit and the side wall 26 of the vessel. The transition portion 62 is shaped to promote the smooth flow of water through the outlet 22 without resultant turbulence which could otherwise disrupt the flow. The transition portion 62 is curved, and has a diameter which decreases in a direction from the side wall 26 towards the outlet conduit 60. A radius of curvature $R_3$ of the transition portion is constant, and is negative, taken with reference to a centre of curvature $C_3$ located within the chamber 16. Thus a wall of the transition portion 62 can be said to be generally concave in shape in that it generally curves inwardly. In the illustrated embodiment, the ratio of the radius of curvature $R_3$ of the transition portion 62, relative to a maximum radius $R_v$ of the vessel 14, is about 1:6. So, with the vessel radius $R_v$ being 60 mm, the radius of curvature of the transition portion is about 10 mm.

The outlet 22 is positioned so that the outlet axis 58 is parallel to a main axis 66 of the vessel 14, and in the illustrated embodiment is coaxial with the main axis. The outlet 22 is also provided at a lower end 68 of the vessel 14, and is lowermost of the vessel. In this way, the flow of water through the chamber 16, and formation of a vortex, is promoted. The inlet 20 is defined by an inlet conduit 72 which is provided in the lid 54, and is positioned between a radially outer edge 74, and a centre 76, of the lid. The inlet conduit 72 is shaped to direct water into the chamber generally tangentially to an internal surface of the chamber, in particular to an internal surface 78 of the side wall 26. This is illustrated in FIG. 2 by the arrow 80, and facilitates the formation of a vortex within the chamber 16, by promoting flow of water in a helical path from the inlet 20 towards the outlet 22. The inlet conduit 72 also comprises an entry portion 82 through which water is fed into the inlet 20, and an exit portion 84 through which water flows into the chamber 16. The exit portion 84 defines an exit 86 which is shaped to direct the water generally tangentially. The entry and exit portions 82, 84 are disposed at non-parallel angles relative to one another so that the conduit 72 has a bent or curved profile. The entry portion 82 defines an entry 88, and is positioned so that an axis 70 of the entry portion is parallel to and spaced from a main axis 66 of the vessel (and so not coaxially oriented).

As water flows down the chamber 16, the diameter of the chamber reduces, and the radius of curvature of the side wall 26 changes, particularly as the water transitions to the region of the chamber where the side wall 26 is of the smallest radius of curvature $R_1$, in the region of the outlet 22. This causes a vortex to form in which the water is accelerated as it flows towards the outlet. Also, the water will descend a smaller vertical distance for each full 360° traverse around the chamber 16.

The vent 24 comprises a vent conduit or pipe 90 having an inlet 92 located in the chamber 16, and an outlet 94 located externally of the chamber, for directing gasses out of the chamber. Typically a one-way valve 96 (FIG. 3) will be coupled to the vent outlet 94 to permit gas to escape from the chamber 16, but prevent external air ingress. The inlet 92 is positioned so that, in use, it is submerged in the water in the chamber 16, preventing exposure of the inlet. The vent conduit 90 is also positioned so that the inlet 92 is coaxial with the main 66 axis of the vessel 14. In this way, the vent conduit inlet 92 is located in a centre of the vessel 14, and therefore at the centre of a vortex which is created when water flows through the vessel. This facilitates discharge of gas through the vent conduit 90. This is because, in use, bubbles of gas coming out of solution from the water will tend to be carried down with the water towards the outlet 22, and generally radially inwardly of the vessel (in particular into the centre of a vortex which may be formed in the tank). Positioning the vent conduit inlet 92 in the region of the outlet 22 may therefore promote the escape of such gases from the chamber. The vent pipe 90 is generally curved or bent, so as to provide a spacing between the outlet 94 and the vessel inlet conduit 72. It will be understood that the vent pipe 90 may be straight or may have some other shape, depending on factors including the overall diameter of the vessel 14 and the diameter of the vent pipe.

The de-aerator 10 can also include a magnetic element (not shown), which would typically be a permanent magnet, for removing ferrous materials from the water. The magnetic element may be positioned below the outlet 22 of the vessel, and may be located in the outlet conduit 60 or the flow conduit 28b.

The de-aerator 10 can be installed as part of a new water heating system or as a retro-fit item. The retro-fit method will be described with reference to the heating system 12 shown in FIG. 3 which, in this situation, would comprise all of the components shown and described above save for the de-aerator 10. The primary water conduit 28 would therefore extend in an unbroken path from the boiler 18 to the radiator 30 prior to installation of the de-aerator 10. The method involves coupling the de-aerator 10 to the primary water conduit 28 at a position which is downstream of the boiler 18, and upstream of the radiators 30 and 32 (such as in the position shown in FIG. 3). A portion of the existing primary water conduit 28 is removed and the de-aerator 10 positioned in its place. This involves making spaced upstream and downstream cuts in the conduit 28, to divide the conduit into an upstream portion (such as the portion 28a) and a downstream portion (such as the portion 28b), and coupling the inlet 20 of the de-aerator 10 to the upstream portion 28a and the outlet 22 of the de-aerator to the downstream portion 28b. The de-aerator 10 may be coupled into the system 12 using suitable connecting conduits.

The applicants have performed tests of a water heating system of the type shown in FIG. 3 both prior to installation of a de-aerator of the type shown in FIG. 1, and following installation of the de-aerator. After installation of the de-aerator, it has been found possible to turn a thermostat setting on the system boiler down from a near maximum setting to a much lower operating level, effectively around 20% to 30% of the previous setting. Also, it has been found that the building in which the heating system is installed heats up to the required level nearly three times faster than it did prior to installation of the de-aerator. This was a surprising improvement in performance, believed to result from the effective removal of air from the water in the system 12, leading to many benefits including reduced energy usage and wear and tear on the boiler and other heating system components, and also returning the heating, or primary water, to a potable state.

A further highly significant advantage which has been discovered from the tests is that the water exiting the de-aerator has been found to be at a higher temperature than the water entering the de-aerator. In other words, and referring to the de-aerator 10 of FIG. 1, the temperature of the water where it exits the de-aerator 10, at the outlet 22, has been found to be higher than the temperature of the water where it enters the de-aerator, at the inlet 20. This increase in temperature occurs without any further input of heat, and result from the highly effective de-aeration which occurs as the water flows from the inlet 20 of the de-aerator 10 to the outlet 20. The tests have shown an increase in temperature of the order of around 2° C., and potentially even up to around 3° C.

In a variation on the heating system 12 shown in FIG. 3, the system can include a further secondary circuit 98, which is shown in broken outline in the drawing. The secondary circuit 98 includes a number of taps or faucets 52a-c which are coupled in a closed loop to the storage vessel 42. A pump 100 is used to continuously drive hot water around the secondary circuit 98 so that hot water can be drawn off through one or more of the taps 52a-c on demand, and without a significant delay between turning on of the tap and the supply of hot water. A second de-aerator 102 of like construction to the de-aerator 10 described above is provided in the secondary circuit 98, for de-aerating the water in the circuit. It will be understood that, in a further variation, a water heating system (not shown) may be provided employing a single de-aerator in a secondary circuit such as the circuit 98.

Turning now to FIGS. 19, 20, 21 and 22, there are shown front, right side, plan and perspective views, respectively, of a de-aerator for use in a heating system in accordance with another embodiment of the present invention, the de-aerator indicated generally by reference numeral 10'. Like components of the de-aerator 10' with the de-aerator 10 of FIGS. 1 and 2 share the same reference numerals, with the addition of the suffix '. Only the substantive differences between the de-aerator 10' and the de-aerator 10 will be described herein.

Figure 21:
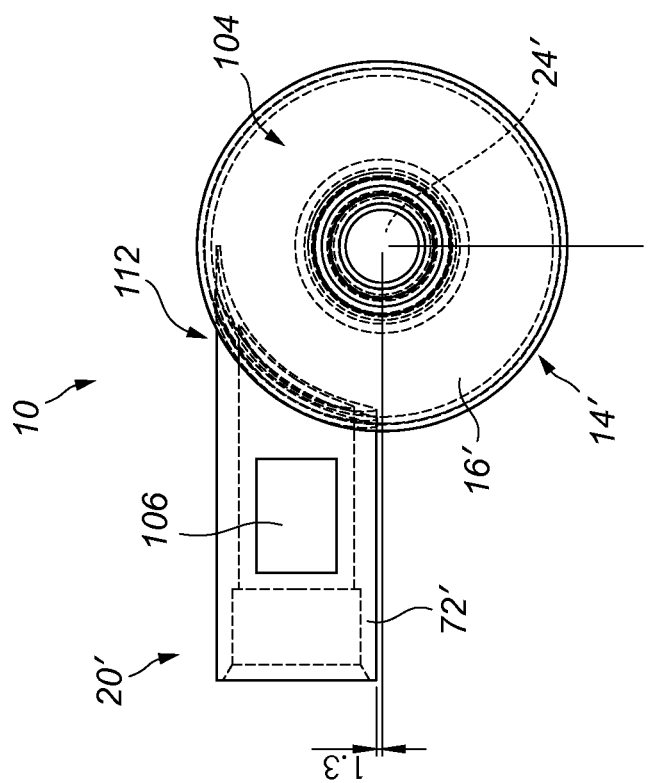

The de-aerator 10' comprises a side-entry type inlet 12' having an inlet conduit 72' which is substantially straight, and arranged to direct water into a chamber 16' defined by a vessel 14' of the de-aerator generally tangentially, as can best be appreciated from FIGS. 20 and 21. The inlet 12' opens on to an intermediate portion 103 of the chamber, which is between an upper portion 104 and a lower end 68'. A side wall 26' of the intermediate portion 103 extends between the inlet 12' and an outlet 22', and is curved with a non-constant radius of curvature, as discussed above. The upper portion 104 of the vessel 14' above the inlet 12' is generally domed, being approximately hemi-spherical in shape. The de-aerator 10' includes a vent 24' in the form of a straight pipe, which is coaxially oriented relative to a main axis 66' of the vessel 14'.

The inlet conduit 72' is internally threaded, and flat surfaces (or "flats") 106 and 108 are provided on an external surface 110 of the inlet conduit 72'. The flats 106 and 108 facilitate coupling of a primary water conduit of a heating system, such as the conduit 28 shown in FIG. 3, to the de-aerator 10'. The flats 106 and 108 allow for a spanner or like tool to be coupled to the conduit 72' so that, when a primary water conduit or connector is threaded into the inlet conduit 72', the transmission of torque to a joint region 112 (FIG. 21) between the conduit 72' and the vessel 14' is reduced.

The de-aerator vessel 14' may be of different dimensions, and/or internal volume, to the vessel 14 described above. In particular, the part of the chamber 16' in the intermediate portion 103 extending down to the lower end 68' may have a different internal diameter, and/or the ratios of diameter to length of said portion may be different to that described above. However, the side-wall 26' of the vessel 14' is shaped so that the vessel remains generally egg-shaped, promoting the de-aeration effects described above.

The results of tests carried out on a heating system incorporating a de-aerator constructed according to the principles discussed above, having the structure shown and described in FIGS. 1 and 2, will now be discussed with reference to FIGS. 23 to 26.

Figure 23:
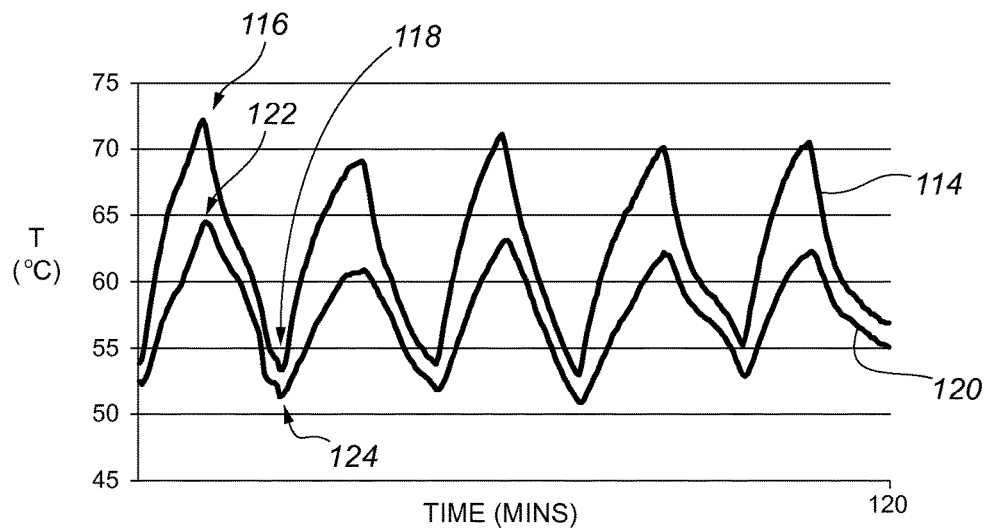
FIG. 23 is a graph showing temperature against time for a heating system incorporating a primary water heater of a conventional type.

FIG. 23 is a graph showing temperature against time for a heating system incorporating a primary water heater in the form of a gas-fired boiler of a conventional type, over a two hour period. The line 114 represents the primary flow temperature over that period, that is the temperature of the water exiting the boiler. As can be seen, the line 114 shows peaks and troughs in the primary flow temperature, which are indicative of periods when the boiler is active, shown by the part of the line building up to the temperature peaks or "spikes" 116; and the periods when the boiler is inactive, shown by the part of the line falling down to the temperature troughs 118. The line 120 represents the primary return temperature over that period, that is the temperature of the water returning to the boiler following passage through the heating system. As can be seen, the line 120 shows peaks 122 and troughs 124 in the primary return temperature, which correspond to the peaks and troughs of the primary flow, when the boiler is active/inactive. There is a difference of approximately 7 to 8° C. between the corresponding primary flow peaks 116 and primary return peaks 122.

Figure 24:
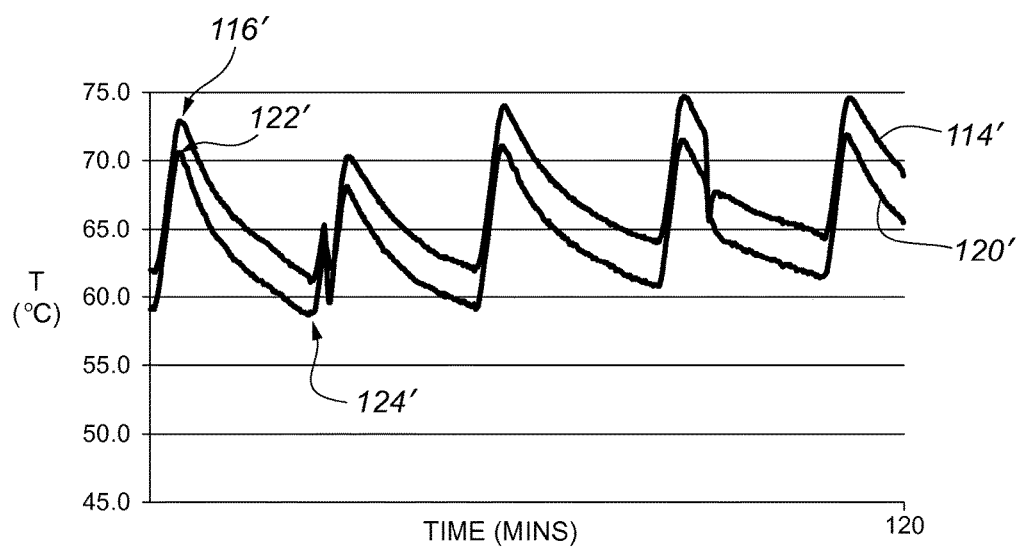
FIG. 24 illustrates the heating system employed in producing the graph of FIG. 23, but incorporating a de-aerator according to the present invention, the system tested over the same period.

FIG. 24 illustrates the same heating system with the de-aerator of the present invention installed, tested over the same period, primary flow indicated by line 114' and primary return by the line 120'. Corresponding lines plus peaks and troughs share the same reference numerals as in FIG. 23, with the addition of the suffix '. As can be seen, the primary flow builds to a temperature which is higher than that of the boiler operated without the de-aerator, at a stable temperature of around 75° C., compared to around 70° C.

In addition, the difference between the peaks 116' of the primary flow and the peaks 122' of the primary return are much closer, with a difference of only around 2 to 3° C. Furthermore, the primary return temperature is significantly higher when employing the de-aerator, as indicated by the troughs 124'. As can be seen, the primary return temperature is around 60° C., in comparison to around 52° C. without the de-aerator.

This is indicative of a number of advantages provided by the de-aerator of the present invention. In particular, a higher primary flow temperature is achieved without increased boiler burn time. In fact, it has been found that boiler burn time is reduced. The higher temperature of the primary return is such that a lower heat input (and so boiler burn time) is required to reheat the water returning to the boiler, which further improves efficiency. The higher primary return heat is also indicative that the thermal capacity of the heating system has effectively been increased, with reduced losses.

Figure 25:
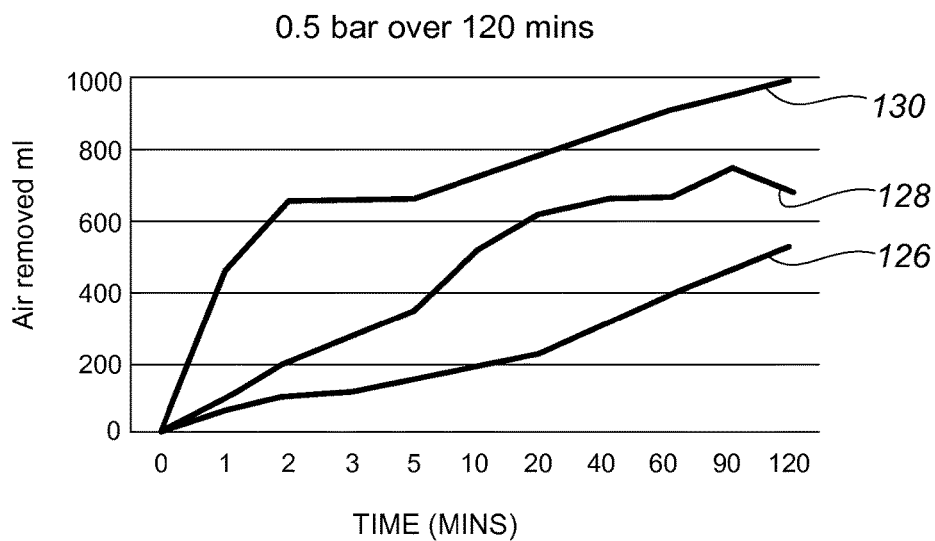
FIG. 25 is a graph showing the volume of removed air against time for another heating system incorporating a primary water heater of a conventional type over a two hour period, the results illustrating performance both with and without a de-aerator according to the present invention.
Figure 26:
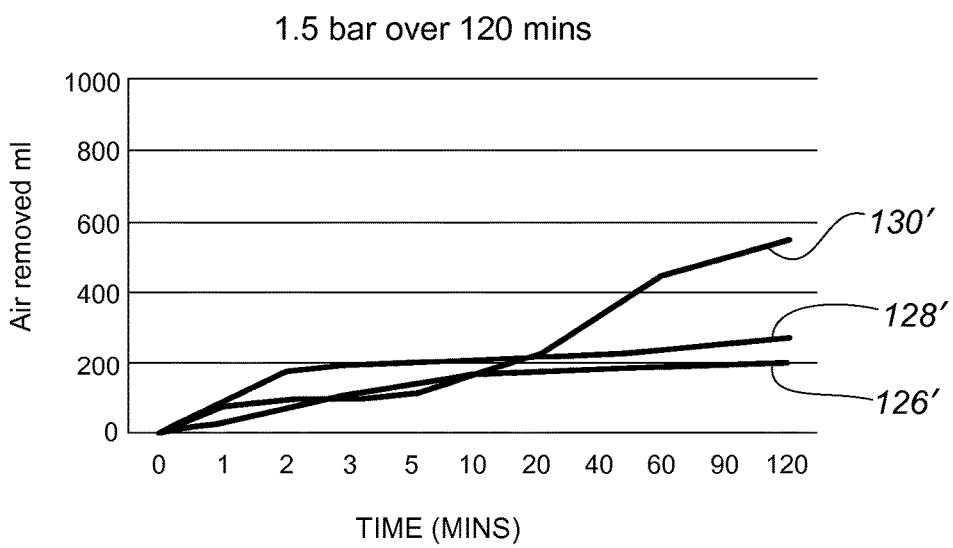
FIG. 26 shows the results of the similar to FIG. 25, in which the test was carried out at a higher operating pressure.

The benefits of using the de-aerator of the present invention, in terms of removal of dissolved air from water in a heating system, are illustrated in FIGS. 25 and 26. FIG. 25 is a graph showing the volume of removed air against time for another heating system incorporating a primary water heater in the form of a gas-fired boiler of a conventional type, over a two hour period. In this example, three lines 126, 128 and 130 are shown.

The line 126 represents the volume of air naturally dissolving out of water in the heating system during operation of the boiler over the two hour period, with a flow rate of approximately 25 l/min, and an operating system pressure of 0.5 bar. Air exits the heating system through a vent having a one-way valve, this air coming out of solution due to the increase in temperature of the water, as discussed above. The line 128 illustrates a boiler of a different type but similar thermal capacity, operated over the same period and under similar operating conditions, the boiler having a built-in air elimination system. As can be seen, higher volumes of air are removed in this instance. The line 130 illustrates the heating system which produced the results indicated by the line 126, but with the de-aerator of the present invention installed. As can be seen, significantly higher volumes of air were removed, even in comparison to the boiler employing the air elimination system. FIG. 26 shows the results of the same test as that of FIG. 25, save that a higher operating pressure of 1.5 bar was employed, the higher pressure resulting in a lower volume of dissolved air coming out of the water in the heating system, in all cases. The lines 126', 128' and 130' correspond to the tests shown and discussed in FIG. 25, with the addition of the suffix '. The effect is slightly less marked in this instance, as can be seen from the line 130'. It is believed that this was due to the higher working pressure causing an O-ring seal on a float in the air vent of the de-aerator being pushed tighter against its seat, preventing the same high speed of air elimination being reached as shown in FIG. 25.

In general terms, tests on the de-aerators of the present invention have shown that the velocity of the water increases as the water flows from the inlet of the de-aerator towards the outlet, with velocity generally being highest at the region of the outlet. However, at lower mass flow rates (~75 l/min) of water, it has been found that the velocity of the water in a central region of a vortex formed proximate to the outlet tends to be lower than at radially outwardly located regions, and can be as low as the velocity at the point where the water flows out of the inlet and into the de-aerator chamber. This effect tends to disappear at higher mass flow rates of up to around 225 l/min. It has also been found that velocity in upper parts of the chamber tends to be higher radially inwardly of the wall of the de-aerator; this is believed to be due to surface friction where the water contacts the surface of the wall.

In terms of pressure, as can be expected, the pressure tends to be lowest in the region of the outlet, particularly in the central region of the vortex. This tends to be the case even when the mass flow rate is increased from the lower levels towards the higher levels discussed above. Pressure tends to be highest towards the inlet, and particularly, in the embodiment 10' of FIG. 19 and at higher mass flow rates (e.g. 225 l/min), in the portion of the wall of the de-aerator chamber which is opposite the inlet 112, where water flowing out of the inlet impinges upon the wall surface.

Some general advantages which follow from use of the de-aerator of the present invention are as follows. The de-aerator can provide up to 30% savings in energy consumption, by effectively increasing the efficiency of the heating system employing the de-aerator, and thereby reducing boiler burn time. Use of the de-aerator has also been found to result in a faster heat-up of the heating system. It has been found that radiators much further away from a boiler operate at a significantly higher heat than without the de-aerator. De-aeration of the water also results in the heat remaining in radiators for a longer period. A heating system employing the de-aerator has been found to be much quieter, due to the absence of air in the system. It has been found that there is an increased flow rate through the system, which evens out "cool" spots. Pump life is increased, due to more efficient running. The de-aerator can run in gas, oil, and lpg fired boiler systems. The de-aerator can run in very large domestic, or smaller commercial heating systems, with high flow velocity. The magnitude of savings are such that the need to install expensive "renewable" energy heating systems is negated. Ancillary benefits are that boiler heat exchanger pathways are protected from deposits of magnetites (due to the reduction of corrosion resulting from expulsion of air from the system). This also improves the clarity of the system water, without the use of additives.

It is believed that one significant underlying reason for the de-aerator of the present invention providing such marked improvements in de-aerating water in a heating system is due to so-called "implosion" effects, which result from flow of the water through the specially shaped vessel of the de-aerator. In particular, it is believed that the de-aerator stimulates a chemical change in the water in the heating system. Heat and agitation each play a part. The "egg-shape" of the de-aerator is such that, as the water enters the de-aerator, it experiences a change in direction (which is immediate in the embodiment shown in FIGS. 1 and 2), and is then forced round and down the vessel very quickly. This causes the water to "implode", stripping the surface tension away from the water. This then releases the trapped air, mainly made up of Nitrogen and Oxygen. These gasses are brought together in such a way that, it is believed, a reaction takes place in which the gasses are "thrown together" to form new compounds, and bigger bubbles are formed which naturally float out of the vessel through the vent, against the flow of water. This process, which continually occurs during flow of water through the system, reduces the dissolved air to a substantially inert level. Air is drawn into the heating system during use, through various means, but is removed in the same way as when the heating system is initiated, and so eliminated from the system without the harmful effects discussed above. This is as a direct result of the "egg-shaped" de-aerator.

Various modifications may be made to the foregoing without departing from the spirit and scope of the present invention.

The radius of curvature of the side wall in the region of the outlet, relative to a radius of the vessel, may be about 1:2, or may be between about 1:2 and about 1:3. For example, in a vessel of radius 60 mm, the radius of curvature of the side wall in the region of the outlet may be about 30 mm, or may be between 30 mm and 20 mm.

The flow conduit/portion of the flow conduit may have a length of at least about 200 mm, or optionally at least about 250 mm Other lengths may be chosen, for example between 300 and 600 mm, or greater than 600 mm.

The radius of curvature of the transition portion, relative to a radius of the vessel, may be about 1:3, may be about 1:4, or may be about 1:5. For example, in a vessel of radius 60 mm, the radius of curvature of the transition portion may be about 20 mm, may be about 15 mm, or may be about 12 mm.

The inlet may open on to an intermediate portion of the chamber, which is between the upper portion and the lower portion. The intermediate portion of the chamber may be of greater diameter than either the upper or lower portions.

An area of the vent conduit inlet may be greater than an area of the outlet. This may promote flow of gases into and along the conduit.

The de-aerator may have a utility in removing air from other fluids and so in other industries/systems.

We claim:

1. A de-aerator for use in a water heating system, the de-aerator comprising:
    a vessel defining a chamber for receiving water which has been heated by a primary water heater, the vessel having an upper end, a lower end, a main axis extending between the upper end and the lower end, an inlet through which water is supplied into the chamber and an outlet through which de-aerated water exits the chamber, in which the outlet opens on to the chamber and is positioned on the lower end of the vessel coaxially with the main axis; and
    a vent through which gas exits the chamber, the vent comprising a conduit, a portion of the conduit extending into the chamber having an inlet and another portion of the conduit extending out of the chamber having an outlet, in which the conduit inlet is located internally within the chamber coaxially with the main axis of the vessel, the conduit outlet is located externally of the chamber, and the conduit extends through the upper end of the vessel;
    wherein:
        a diameter of the chamber decreases in a direction from the inlet towards the outlet; and
        the vessel has a side wall extending between the inlet and the outlet which defines a boundary of the chamber, the side wall being curved in a longitudinal plane and having a non-constant radius of curvature between the inlet and the outlet, the radius of curvature being smaller in the region of the outlet than in the region of the inlet;
    so that water supplied into the chamber is accelerated as it flows from the inlet towards the outlet, to thereby promote de-aeration of the water, gasses coming out of solution from the water exiting the chamber through the vent.

2. A de-aerator as claimed in claim 1, in which the chamber is at least partially egg-shaped.

3. A de-aerator as claimed in claim 2, in which the side wall has a shape which generally conforms to the shape of part of the surface of an egg.

4. A de-aerator as claimed in claim 1, in which the side wall has a radius of curvature which progressively decreases in a direction from the inlet towards the outlet.

5. A de-aerator as claimed in claim 1, in which the portion of the vessel defined by the side wall has a length, and the internal diameter of the vessel decreases in a direction from a top of the vessel to a bottom of the vessel.

6. A de-aerator as claimed in claim 5, in which, at a position which is 1/6 of the distance along the length of the vessel taken from its top, a ratio of the internal diameter of the vessel relative to the length at that position is from 4.250 to 4.260; at a position which is 2/6 of the distance along said length, a ratio of the internal diameter of the vessel relative to the length at that position is from 2.040 to 2.050; at a position which is 3/6 of the distance along said length, a ratio of the internal diameter of the vessel relative to the length at that position is from 1.260 to 1.270; at a position which is 4/6 of the distance along said length, a ratio of the internal diameter of the vessel relative to the length at that position is from 0.820 to 0.830; at a position which is 5/6 of the distance along said length, a ratio of the internal diameter of the vessel relative to the length at that position is from 0.470 to 0.480; and at a position which is at the full length of the vessel taken from its top, a ratio of the diameter of the vessel relative to the length at that position is from 0.170 to 0.180.

7. A de-aerator as claimed in claim 1, in which the side wall of the vessel has radii of curvature which are positive, taken with reference to centres of curvature located within the chamber.

8. A de-aerator as claimed in claim 7, in which the radius of curvature of the side wall in the region of the outlet, relative to a radius of the vessel, is 1:3.

9. A de-aerator as claimed in claim 1, comprising an outlet conduit which defines the vessel outlet, and a transition portion extending between the outlet conduit and the side wall of the vessel, the transition portion being curved and having a diameter which decreases in a direction from the side wall towards the outlet conduit.

10. A de-aerator as claimed in claim 1, in which the inlet is shaped to direct water into the chamber generally tangentially to an internal surface of the chamber.

11. A de-aerator as claimed in claim 10, in which the inlet comprises an entry portion through which water is fed into the inlet, and an exit portion through which water flows into the chamber, the exit portion being shaped to direct the water generally tangentially, and the entry portion positioned so that an axis of the entry portion is generally parallel to a main axis of the vessel.

12. A water heating system comprising:
    a primary water heater;
    a primary water circuit having a primary water conduit coupled to the primary heater so that water in the primary water conduit flows in a closed loop through the primary water heater;
    at least one space heater arranged in fluid communication with the primary water conduit; and
    a de-aerator according to claim 1;
    in which the de-aerator is in fluid communication with the primary water conduit so that the water flowing in the primary water conduit flows through the de-aerator, which operates to de-aerate the water.

13. A water heating system as claimed in claim 12, in which the volume of the de-aerator chamber, as a proportion of the total volume of water in the heating system, is no more than 0.3%.

14. A water heating system as claimed in claim 12, comprising a flow conduit coupled to the vessel outlet so that fluid exiting the outlet flows through the flow conduit, the vessel being positioned so that the outlet is in a vertical orientation and so that at least part of the flow conduit is also vertically oriented, said part of the flow conduit having a length of at least 300 mm.

15. A water heating system as claimed in claim 14, in which said part of the flow conduit has a length of at least 600 mm.

16. A water heating system comprising:
    a primary water heater;
    a primary water circuit having a primary water conduit coupled to the primary heater so that water in the primary water conduit flows in a closed loop through the primary water heater;
    a water storage vessel provided in a secondary circuit which is in fluid communication with the primary water conduit, water flowing from the primary circuit into the secondary circuit to heat ambient water contained within the storage vessel;

a further secondary circuit having a secondary conduit coupled to the storage vessel so that water in the secondary conduit flows in a closed loop through the storage vessel;

at least one tap or faucet coupled to the secondary conduit for the discharge of heated water from the further secondary circuit; and a de-aerator according to claim 1;

in which the de-aerator is in fluid communication with the secondary conduit of the further secondary circuit so that the water flowing in the secondary conduit flows through the de-aerator, which operates to de-aerate the water.

17. A de-aerator as claimed in claim 1, in which the vent conduit inlet faces towards the vessel outlet.

18. A de-aerator for use in a water heating system, the de-aerator comprising:

a vessel defining a chamber for receiving water which has been heated by a primary water heater, the vessel having an upper end, a lower end, a main axis extending between the upper end and the lower end, an inlet through which water is supplied into the chamber and an outlet through which de-aerated water exits the chamber, in which the outlet opens on to the chamber and is positioned on the lower end of the vessel coaxially with the main axis; and a vent through which gas exits the chamber, the vent comprising a conduit, a portion of the conduit extending into the chamber having an inlet and another portion of the conduit extending out of the chamber having an outlet, in which the conduit inlet is located internally within the chamber coaxially with the main axis of the vessel, the conduit outlet is located externally of the chamber, and the conduit extends through the upper end of the vessel;

wherein a diameter of the chamber decreases in a direction from the inlet towards the outlet; and the vessel has a side wall extending between the inlet and the outlet which defines a boundary of the chamber, the side wall being curved in a longitudinal plane and having a non-constant radius of curvature between the inlet and the outlet, the radius of curvature being smaller in the region of the outlet than in the region of the inlet.

19. A de-aerator as claimed in claim 18, in which the vent conduit inlet faces towards the vessel outlet.

\* \* \* \* \*